US009463894B2

(12) United States Patent
Minnette et al.

(10) Patent No.: US 9,463,894 B2
(45) Date of Patent: Oct. 11, 2016

(54) RETORTABLE PACKAGE

(71) Applicant: Berry Plastics Corporation, Evansville, IN (US)

(72) Inventors: Jeffrey C. Minnette, Evansville, IN (US); Ken Jochem, Mt. Vernon, IN (US)

(73) Assignee: Berry Plastics Corporation, Evansville, IN (US)

( * ) Notice: Subject to any disclaimer, the term of this patent is extended or adjusted under 35 U.S.C. 154(b) by 106 days.

(21) Appl. No.: 13/875,022

(22) Filed: May 1, 2013

(65) Prior Publication Data

US 2013/0292394 A1  Nov. 7, 2013

Related U.S. Application Data

(60) Provisional application No. 61/641,066, filed on May 1, 2012.

(51) Int. Cl.
| B65D 41/16 | (2006.01) |
| B65D 41/18 | (2006.01) |
| B65D 41/00 | (2006.01) |
| B65D 1/40 | (2006.01) |
| B65D 79/00 | (2006.01) |
| B29L 31/00 | (2006.01) |
| B29C 45/14 | (2006.01) |

(52) U.S. Cl.
CPC ............. B65D 1/40 (2013.01); B65D 79/005 (2013.01); B29C 45/14508 (2013.01); B29L 2031/712 (2013.01); B29L 2031/7174 (2013.01); B65D 2543/0037 (2013.01)

(58) Field of Classification Search
CPC ....................................... B65D 1/42

USPC ......... 220/494, 495, 600, 609, 62.13, 62.18, 220/626, 319
See application file for complete search history.

(56) References Cited

U.S. PATENT DOCUMENTS

| 2,982,440 | A | * | 5/1961 | Harrison | 220/609 |
| 3,690,507 | A | * | 9/1972 | Gailus et al. | 220/608 |
| 3,870,188 | A | * | 3/1975 | Buffett | 220/675 |
| 3,956,550 | A | * | 5/1976 | Sutch | 428/81 |
| 4,109,815 | A | * | 8/1978 | Collins, III | 215/232 |
| 4,442,971 | A | * | 4/1984 | Helms | 229/123.1 |
| 4,448,345 | A | * | 5/1984 | Helms | 229/123.1 |

(Continued)

FOREIGN PATENT DOCUMENTS

| BE | 532675 A | 2/1958 |
| GB | 2201392 A | 9/1988 |

(Continued)

OTHER PUBLICATIONS

PCT International Search Report and Written Opinion completed by the ISA/US on Aug. 5, 2013 and issued in connection with PCT/US2013/039065.

(Continued)

*Primary Examiner* — Fenn Matthew
*Assistant Examiner* — Chetan Chandra
(74) *Attorney, Agent, or Firm* — Barnes & Thornburg LLP

(57) ABSTRACT

A package includes a lid adapted to mate with the brim of a container. An interior chamber of the package is bounded by the container and the lid when the lid is mounted on the container brim.

12 Claims, 12 Drawing Sheets

(56) References Cited

U.S. PATENT DOCUMENTS

| | | | |
|---|---|---|---|
| 4,542,029 A * | 9/1985 | Caner et al. | 426/127 |
| 4,735,339 A | 4/1988 | Benge | |
| 4,836,398 A * | 6/1989 | Leftault et al. | 220/609 |
| 4,880,129 A * | 11/1989 | McHenry et al. | 220/609 |
| 5,217,737 A | 6/1993 | Gygax et al. | |
| 5,234,126 A * | 8/1993 | Jonas et al. | 220/609 |
| 5,236,102 A * | 8/1993 | Quittmann et al. | 220/23.87 |
| 5,752,614 A * | 5/1998 | Nelson et al. | 220/276 |
| 6,234,386 B1 * | 5/2001 | Drummond et al. | 229/123.2 |
| 6,439,413 B1 | 8/2002 | Prevot et al. | |
| 6,637,176 B1 * | 10/2003 | Krall | 53/420 |
| 6,749,066 B2 * | 6/2004 | Bergman | 206/524.4 |
| 6,763,968 B1 * | 7/2004 | Boyd et al. | 220/608 |
| 7,055,713 B2 * | 6/2006 | Rea et al. | 220/276 |
| 7,169,419 B2 | 1/2007 | Dalton et al. | |
| 7,264,132 B2 * | 9/2007 | Basara | 220/62.12 |
| 7,563,495 B2 * | 7/2009 | Anelli | 428/34.6 |
| 7,963,419 B2 * | 6/2011 | Burney et al. | 220/780 |
| 8,251,245 B2 * | 8/2012 | DiPietro et al. | 220/324 |
| 8,528,770 B2 * | 9/2013 | Albrecht et al. | 220/266 |
| 8,733,572 B2 * | 5/2014 | Ruiz Carmona | 220/23.83 |
| 8,998,030 B2 * | 4/2015 | Minnette et al. | 220/780 |
| 2004/0060458 A1 * | 4/2004 | Janka | 99/470 |
| 2004/0232026 A1 * | 11/2004 | Goeking et al. | 206/459.1 |
| 2005/0284171 A1 * | 12/2005 | Harl et al. | 62/457.2 |
| 2006/0201946 A1 * | 9/2006 | Witt | 220/276 |
| 2008/0264939 A1 * | 10/2008 | Bray et al. | 220/9.1 |
| 2010/0176134 A1 * | 7/2010 | Cramer | 220/378 |
| 2010/0237069 A1 * | 9/2010 | Helou et al. | 220/200 |
| 2011/0049155 A1 * | 3/2011 | Levine et al. | 220/319 |
| 2011/0204067 A1 * | 8/2011 | Schneider et al. | 220/606 |
| 2012/0199599 A1 * | 8/2012 | Minnette et al. | 220/780 |
| 2013/0020336 A1 * | 1/2013 | Luburic et al. | 220/675 |
| 2013/0104505 A1 * | 5/2013 | Minnette et al. | 53/471 |

FOREIGN PATENT DOCUMENTS

| | | | |
|---|---|---|---|
| GB | 2269152 A * | 2/1994 | B65D 1/40 |
| WO | 2007088212 A1 | 8/2007 | |
| WO | 2011131893 | 10/2011 | |

OTHER PUBLICATIONS

Chinese Office Action dated Oct. 28, 2015 for Chinese Application No. 201380030372.2, 6 pages.
Supplemental European Search Report, Application No. 13785193.7-1708 / 2844584 PCT/US2013/039065, Apr. 28, 2015, 5 pages.
Office Action for Chinese Patent Application No. 201380030372.2, dated Jun. 28, 2016, including English language summary, 5 pages.

* cited by examiner

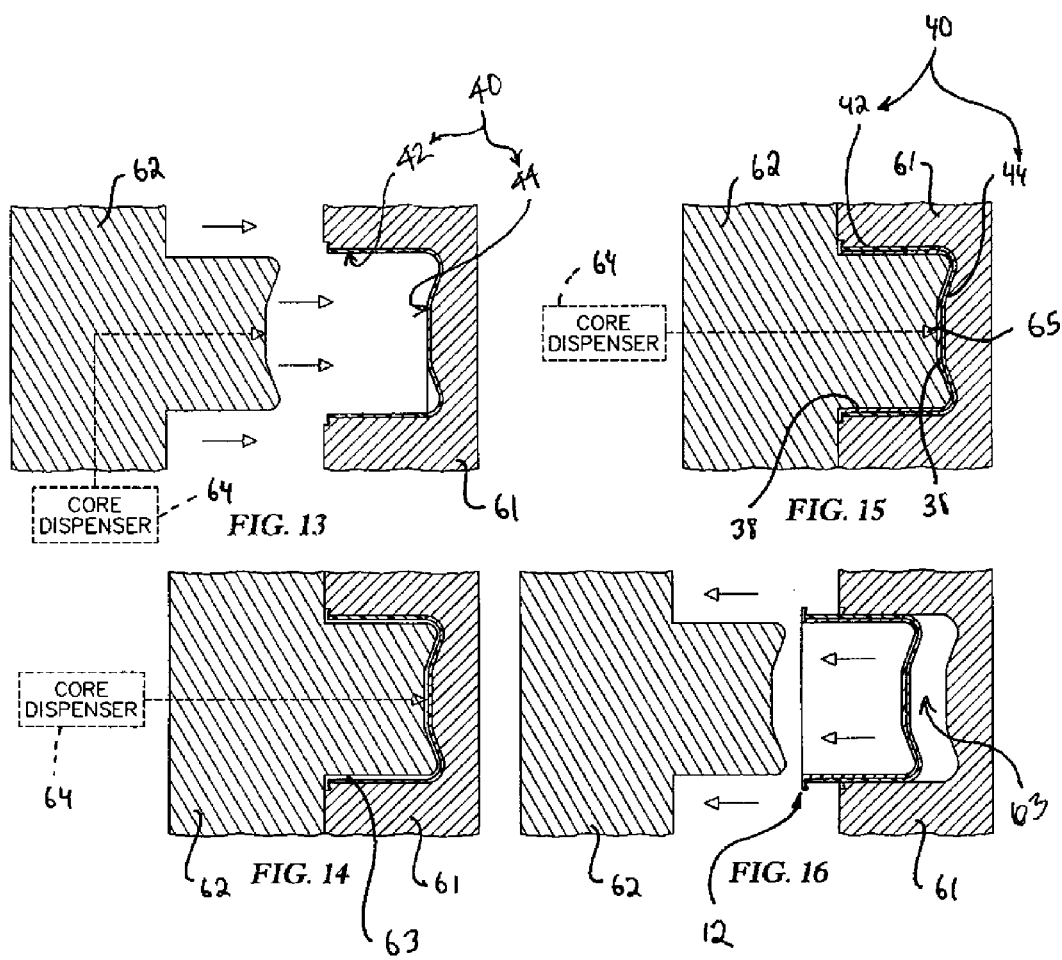

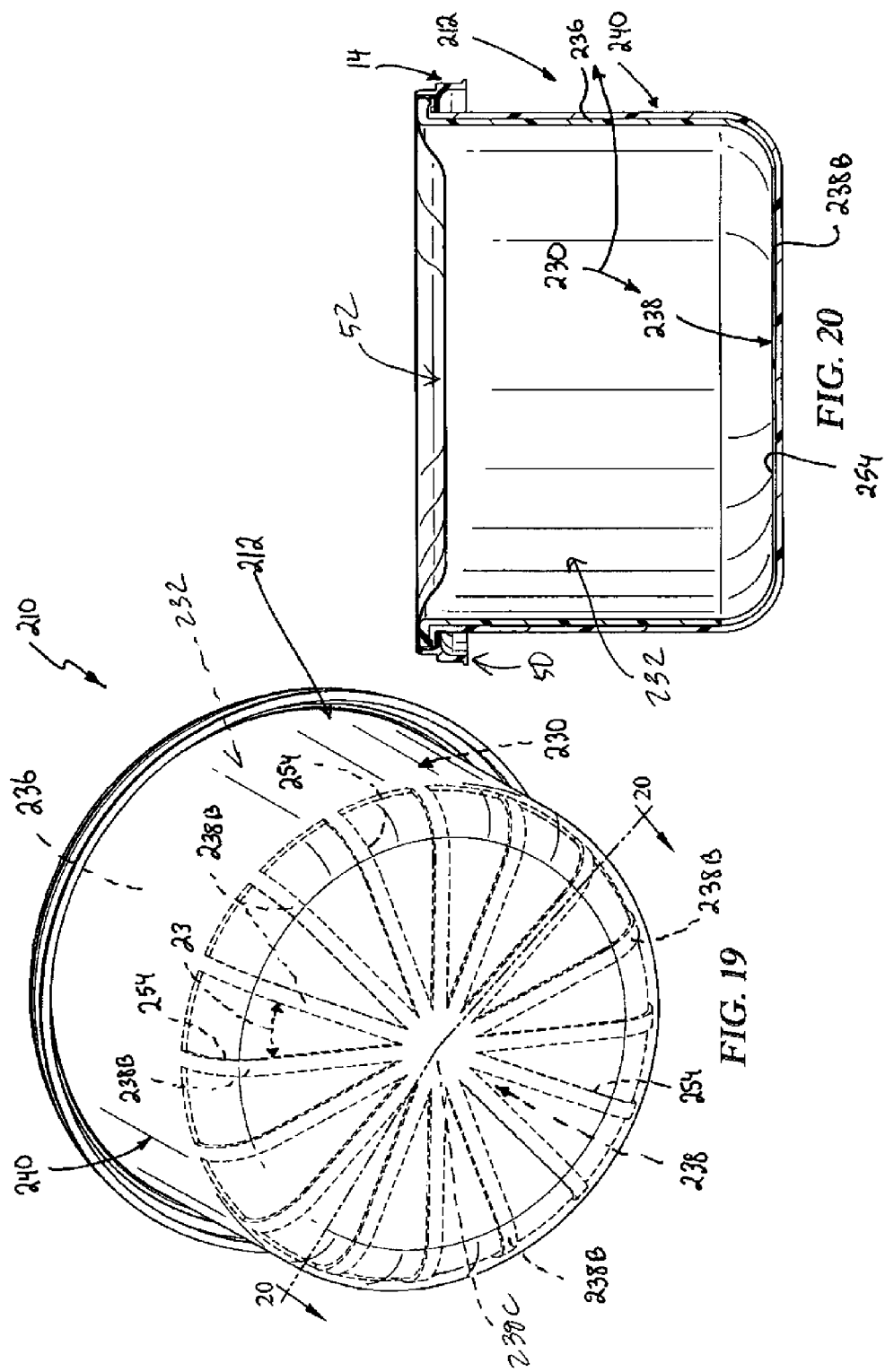

RETORTABLE PACKAGE

PRIORITY CLAIM

This application claims priority under 35 U.S.C. §119(e) to U.S. Provisional Application Ser. No. 61/641,066, filed May 1, 2012, which is expressly incorporated by reference herein.

BACKGROUND

The present disclosure relates to a package, and in particular to a package including a container and a lid for the container. More particularly, the present disclosure relates to a package that is retortable and thus can survive exposure to high temperature.

SUMMARY

A package in accordance with the present disclosure includes a lid adapted to mate with the brim of a container to close an opening into an interior product-storage region formed in the container. In illustrative embodiments, the package is configured to store food that has been placed in the interior product-storage region formed in the container in a variable-volume interior chamber bounded by the container and lid when the lid is mounted on the container brim.

The package is retortable and portions are elastic to cause an increase in the volume of the variable-volume interior chamber during exposure of the retortable package to high temperatures in an oven for several minutes to sterilize food stored in the variable-volume interior chamber formed in the package. The pressure in the variable-volume interior chamber increases as the temperature increases to deform elastically portions of the lid or container or both to increase the volume of the variable-volume interior chamber in the retortable package without any discharge of fluid from the variable-volume interior chamber.

In illustrative embodiments, the container includes a cup encased in an exterior casing. The cup is formed to include a brim that also functions as the brim of the container and is adapted to mate with the lid. The cup is also formed to include side and bottom panels that cooperate to form an interior product-storage region located below the brim. The exterior casing can provide one or more of a rigidifying support web for the cup, a substrate for printed graphics for the cup, and an oxygen-barrier shield for the cup. The cup and exterior casing are made of food-grade polypropylene or other suitable polymeric material or film.

In illustrative embodiments, the exterior casing includes a sleeve made of film wrapped around a side panel of the cup and a base also made of film and coupled to a lower end of the sleeve. The base is arranged to mate with the underside of a bottom panel of the cup to form the floor of the container. In an illustrative process, the sleeve and base are joined together when heated to produce the exterior casing and the cup is formed in a mold cavity containing the exterior casing using insert-molding techniques to produce a container in which the exterior casing is coupled to exterior surfaces of the side and bottom panels of the cup.

In illustrative embodiments, the retortable package expands and contracts during exposure to pressure and temperature changes caused by heating the package to high sterilization temperatures during a retort process to allow the volume of an interior chamber formed in the retortable package to vary without bursting or damaging the package and without discharging fluid from the variable-volume interior chamber to the surroundings. Portions of the lid and container are made of expansible elastic materials that expand to assume an inflated shape without bursting or exceeding an elastic limit associated with the expansible elastic materials when moving on a conveyor through a hot oven (e.g., retort or autoclave machine) to sterilize food stored in the retortable package and then contract when cooled to assume an original pre-expansion shape or a shape that is nearly the same as the original pre-expansion shape.

In illustrative embodiments, the lid comprises an expansible membrane sheet mounted on a sheet-support ring. The sheet-support ring is configured to mate temporarily with the brim of the container to retain the expansible membrane sheet in mating and sealing engagement with the container brim. The expansible membrane sheet is made of a pliable elastic material. A peripheral portion of the sheet is bonded permanently to the surrounding sheet-support ring. A central portion of the sheet is configured to inflate and move upwardly relative to the sheet-support ring away from the floor of the cup to increase the volume of the interior chamber when the retortable package is heated in a hot oven and the pressure in the interior increases. The expansible membrane sheet is elastic and configured to contract when cooled to assume (or nearly assume) an original pre-expansion shape.

In illustrative embodiments, the container includes an expansible floor configured to inflate and move downwardly relative to the lid to increase the volume of the variable-volume interior chamber when the retortable package is heated in a hot oven and the pressure in the interior chamber increases. The expansible floor is elastic and configured to contract when cooled to assume (or nearly assume) an original pre-expansion shape.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 12-16 show an illustrative process for forming the retortable package of FIGS. 1-4 in a mold;

FIG. 12 is a diagrammatic and perspective view showing a lower mold portion formed to include a female mold cavity and insertion of a strip made of film and a disk made of film into the mold cavity during a first molding stage;

FIG. 13 is a sectional view of a plastics injection mold after the film disk and strip have been deposited in the female mold cavity of the lower mold portion prior to movement of a companion upper mold portion toward the lower mold portion;

FIG. 14 is a view similar to FIG. 13 after the upper and lower mold portions have been moved to assume closed positions forming a mold cavity containing the film disk and strip prior to injection of plastics material into the mold cavity by a core dispenser coupled to the plastics injection mold;

FIG. 15 is a view similar to FIG. 14 after the core dispenser has injected molten plastics material into the mold cavity filling the mold cavity to form the cup and coupling the film disk to the film strip to form the exterior casing surrounding the cup;

FIG. 16 is a view similar to FIG. 15 after the companion upper mold portion has moved away from the lower female mold cavity and the completed container is being removed from the lower female mold cavity;

FIGS. 19 and 20 are another embodiment of a retortable package in accordance with the present disclosure;

FIG. 19 is a bottom perspective view showing that the retortable package includes a lid including an elastic expansible membrane sheet and a surrounding sheet-support ring, and a container comprising a cup including an annular brim arranged to provide a brim of the container and adapted to mate with the sheet-support ring of the lid and an exterior casing for the cup comprising a sleeve and a base underlying the sleeve; and FIG. 20 is a sectional view taken along line 20-20 of FIG. 19.

DETAILED DESCRIPTION

Figure 1:
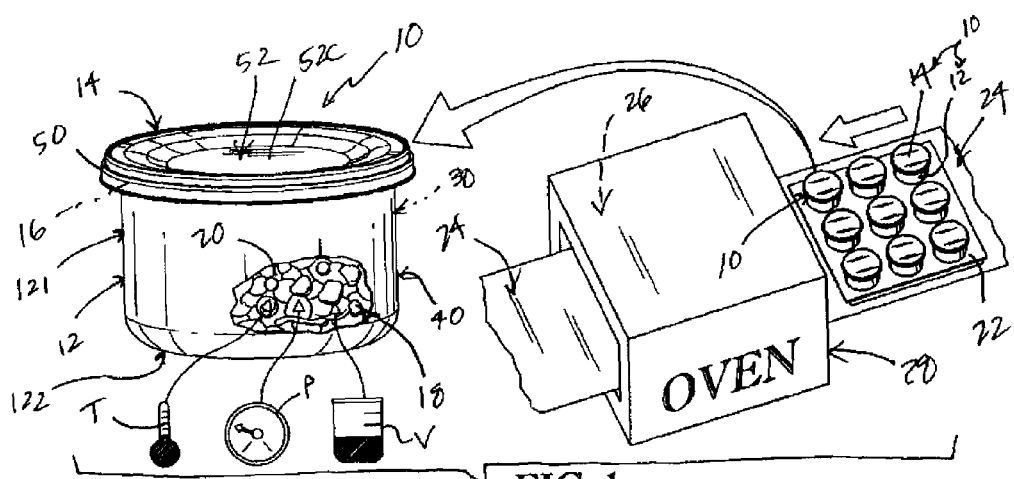
FIG. 1 is a diagrammatic view showing a tray carrying nine retortable packages in accordance with a first embodiment of the present design and moving along a conveyor toward an oven and showing an enlarged perspective view of one of those retortable packages before it is heated and pressurized in the oven and showing that the retortable package comprises a lid mounted on a brim of a container to form a closed variable-volume interior chamber containing a food product.

A retortable package 10 in accordance with the present disclosure includes a container 12 and a lid 14 as suggested in FIGS. 1-4. Lid 14 is adapted to be mounted on a brim 16 of container 12 to form a variable-volume interior chamber 18 of retortable package 10 as suggested in FIGS. 1 and 6. In illustrative embodiments, portions of lid 14 and container 12 are made of an expansible elastic material and have pre-expansion shapes as suggested in FIGS. 1, 3, 5, and 6. As suggested in FIGS. 1-3, retortable package 10 is heated to high sterilization temperatures and then cooled during a retort process to sterilize contents 20 stored in variable-volume interior chamber 18 of retortable package 10. Although the volume of interior chamber 18 changes during the package heating and cooling process in accordance with the present disclosure, no fluid or solid matter contained in the variable-volume interior chamber of the retortable package is discharged to the surroundings.

The expansible elastic portions of retortable package 10 (e.g., portions of membrane sheet 52 in lid 14 and floor 122 in container 12) expand as suggested in FIGS. 2 and 8-10 to assume inflated shapes when retortable package 10 is heated to increase pressure in variable-volume interior chamber 18 (and increase the volume of interior chamber 18). Then those expansible plastic portions of retortable package 10 contract (in illustrative embodiments) to return to the pre-expansion shapes when retortable package 10 is later cooled as suggested in FIGS. 3 and 5-7 to decrease pressure in variable-volume interior chamber 18 (and thus decrease the volume of interior chamber 18) without bursting or damaging retortable package 10.

Figure 2:
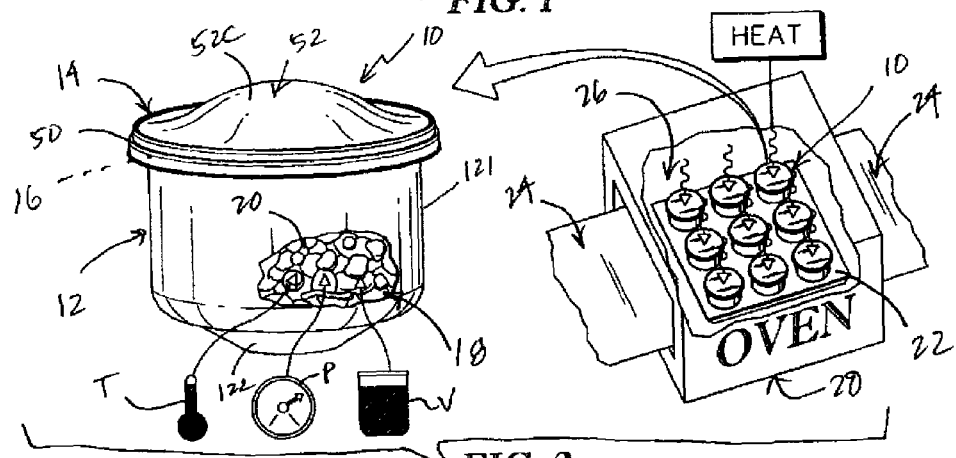
FIG. 2 is a view similar to FIG. 1 showing that the tray has moved into a hot oven to heat each of the nine retortable packages and an enlarged perspective view of the retortable package that was singled out and shown in FIG. 1 and showing that a central portion of the elastic expansible membrane sheet of the lid included in the retortable package shown in FIG. 1 expands upwardly and a portion of an elastic expansible floor of the container included in the package expands downwardly during exposure of the package to high temperatures in an oven leading to an increase in pressure in the closed variable-volume interior chamber formed in the package during sterilization of the contents of the package to increase the volume of the variable-volume interior chamber provided in the retortable package without bursting or damaging the retortable package and without discharging fluid from the variable-volume interior chamber even though the pressure inside the retortable package increased when the retortable package was heated.
Figure 3:
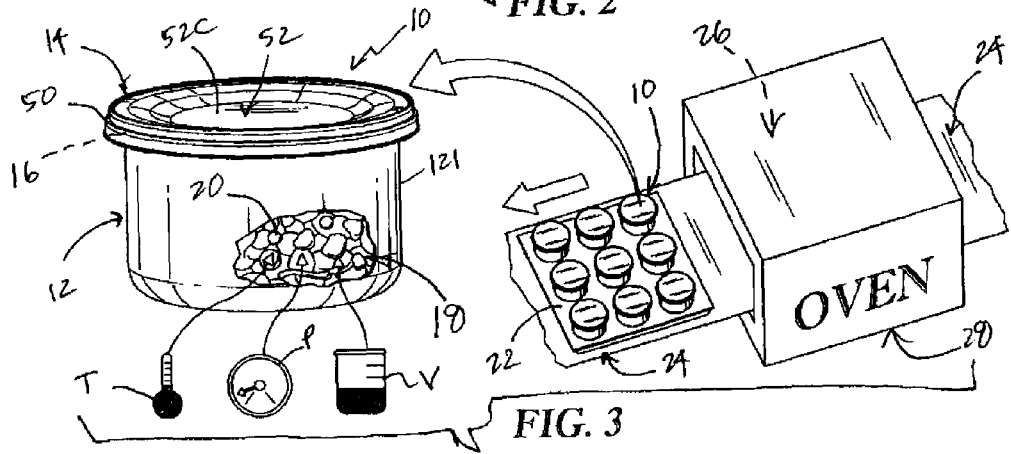
FIG. 3 is a view similar to FIGS. 1 and 2 showing that each of the elastic expansible membrane sheets of the lid and the elastic expansible floor contracts in size when cooled after discharge of the retortable package from the oven to assume the original pre-expansion shapes shown in FIG. 1.

In an illustrative process shown diagrammatically in FIGS. 1-3, nine retortable packages 10 are placed on a tray 22 moving on a conveyor 24 through a heating chamber 26 formed in an oven 28 (e.g., retort or autoclave machine). Each retortable package 10 is heated in heating chamber 26, causing the temperature (as measured by thermometer T) and pressure (as measured by pressure gauge P) in variable-volume interior chamber 18 of each retortable package 10 to increase and inflate predetermined portions of lid 14 and container 12 and thereby increase the volume of variable-volume interior chamber 18 (as measured by volume gauge V) in accordance with the present disclosure. Each retortable package 10 then exits heating chamber 26 as tray 22 moves on conveyor 24 out of and away from oven 28 to allow each retortable package 10 to cool and the pressure in variable-volume interior chamber 18 of each retortable package 10 to decrease. As the pressure in variable-volume interior chamber 18 decreases, the predetermined portions of lid 14 and container 12 deflate and contract so as to move to assume their pre-expansion shapes and the temperature, pressure, and volume in variable-volume interior chamber 18 of retortable package 10 return substantially to the original pre-expansion state.

Package 10 in accordance with the present disclosure is well-suited for use with hot-filled non barrier containers. It may also be used with barrier, retortable containers. Sustainability is enhanced because container 12 and lid 14 are made of like materials without the inclusion of metal rings or other non-plastics materials in illustrative embodiments.

Figure 4:
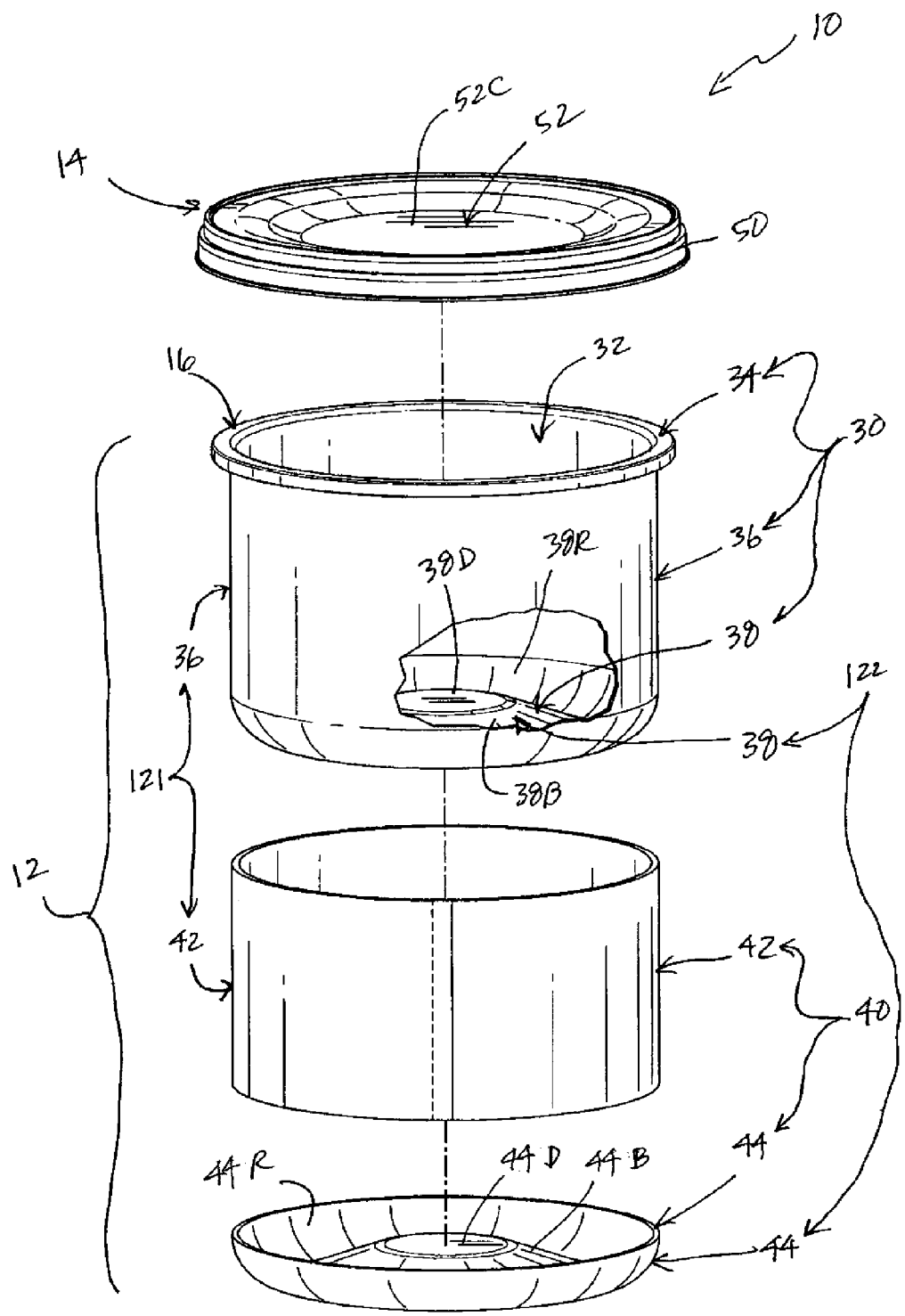
FIG. 4 is an exploded diagrammatic perspective view showing components included in the retortable package of FIG. 1 (after they have been disassembled for purposes of this illustration) and showing, from top to bottom, a lid including an elastic expansible membrane sheet coupled to a surrounding sheet-support ring, and a container comprising a cup providing an interior product-storage region and including an annular brim arranged to provide a brim of the container and adapted to mate with the sheet-support ring of the lid and an exterior casing for the cup comprising a sleeve and a base underlying the sleeve.

Illustrative components used to create retortable package 10 are shown in FIG. 4. Container 12 includes a cup 30 and an exterior casing 40. Exterior casing 40 is coupled to exterior surfaces of cup 30 to produce container 12 as suggested in FIGS. 4 and 6.

Cup 30 is formed to include an interior product-storage region 32 and an annular brim 34 bordering an opening 33 into interior product-storage region 32 as suggested in FIG. 4. Cup 30 also includes an annular side panel 36 coupled to annular brim 34 and a bottom panel 38 coupled to a lower portion of side panel 36 to cooperate therewith to form interior product-storage region 32. Bottom panel 38 of cup 30 is made of an expansible elastic material. Cup 30 is monolithic in an illustrative embodiment. Annular brim 34 of cup 30 functions as brim 16 of container 12 in an illustrative embodiment. Lid 14 is adapted to mate with brim 16 of container 12 to close the opening 33 into interior product-storage region 32 formed in cup 30 to create the variable-volume interior chamber 18 of retortable package 10 as suggested in FIG. 6.

Exterior casing 40 includes a sleeve 42 adapted to mate with an exterior surface of cup side panel 36 and a base 44 adapted to mate with an exterior surface of cup bottom panel 38 as suggested in FIG. 4. In an illustrative process suggested in FIGS. 12-16, a disk 44D is placed in a female mold 61 during an insert-molding manufacturing process to produce a cup base 44 and a strip 42S is also formed during that same manufacturing process to produce sleeve 42 and sleeve 42 is joined to base 44 to produce an exterior casing 40 that is mated to exterior surfaces of side and bottom panels 36, 38 of cup 30 as cup 30 is insert-molded in a mold cavity 63 containing strip 42S and disk 44D. One end 421 of strip 42S is arranged to overlap a second end 422 of strip 42S as suggested in FIG. 4 to produce sleeve 42. Base 44 has a shape matched to the exterior shape of cup bottom panel 38 and is made of an expansible elastic material. Sleeve 42 and base 44 are made of the same material in an illustrative embodiment. It is within the scope of this disclosure to use an exterior casing comprising a sleeve or a base or a sleeve and a base.

Depending upon the package application, exterior casing 40 can play one or more of the following roles when coupled to cup 30 to produce a container 12 in accordance with the present disclosure. Exterior casing 40 can provide a support web to rigidify all or part of cup 30 to allow portions of cup 30 to be made of thin non-rigid materials. Exterior casing 40 can provide a substrate for printed graphics on cup 30. Exterior casing 40 can provide an oxygen-barrier shield to provide means for blocking flow of oxygen into interior product-storage region 32 through cup 30.

Figure 6:
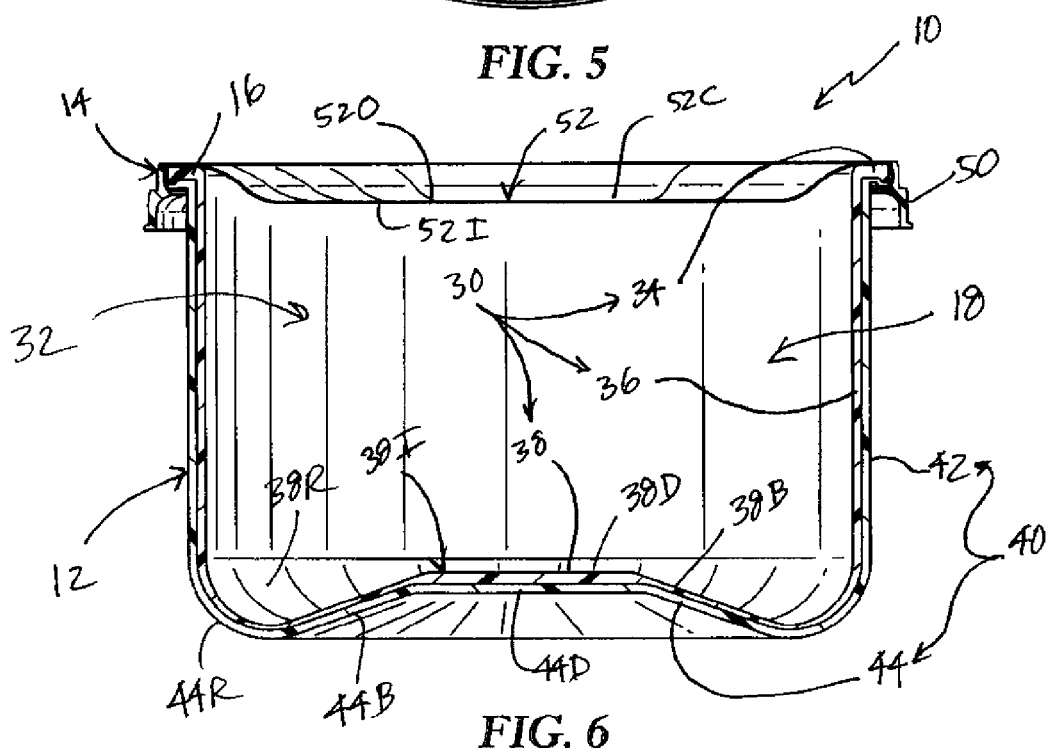
FIG. 6 is a sectional view taken along line 6-6 of FIG. 5 showing that the cup is encased in the exterior casing to form a container coupled to the lid and showing that each of the elastic expansible sheet membranes included in the lid and the elastic expansible floor included in the container are configured to assume illustrative pre-expansion shapes in which the expansible sheet membrane has a concave outer surface and the floor also has a concave outer surface.

Container 12 includes a side wall 121 and a floor 122 coupled to a lower edge of side wall 121 as suggested in FIGS. 1 and 6. Side wall 121 is arranged to interconnect brim 16 and floor 122. In illustrative embodiments, side panel 36 of cup 30 is coupled to sleeve 42 of exterior casing 40 to form the container side wall 121 and bottom panel 38 of cup 30 is coupled to base 44 of exterior casing 40 to form container floor 122. Container floor 122 is expansible and elastic and configured to move from the inwardly extending pre-expansion shape (surrounded in part by side wall 121) shown in FIGS. 6 and 7 to the outwardly extending inflated shape (extended away from lid 14) shown in FIGS. 9 and 10 in response to an increase in pressure in interior chamber 18 of package 10.

Lid 14 includes a sheet-support ring 50 and a membrane sheet 52 as suggested in FIGS. 4-7. Membrane sheet 52 is coupled permanently to sheet-support ring 50 to move therewith relative to container 12 as suggested in FIG. 4. Membrane sheet 52 comprises multiple layers in illustrative embodiments. Reference is hereby made to U.S. application Ser. No. 13/362,953, filed Jan. 31, 2012, which application is hereby incorporated herein in its entirety, for disclosure relating to the structure, function, and operation of lid 14.

Package 10 in accordance with the present disclosure includes a container 12 and a lid 14 configured to mate with container 12 to close an opening 33 into an interior product-storage region 32 formed in cup 30 and form a variable-volume interior chamber 18 in retortable package 10 as suggested in FIGS. 1-4. Lid 14 comprises a sheet-support ring 50 configured to mate with a brim 16 of container 12 as suggested in FIGS. 2-4 and a membrane sheet 52 coupled permanently to the sheet-support ring 50 to move therewith whenever lid 14 is moved relative to container brim 16. Membrane sheet 52 is a barrier material that is configured to mate with container brim 16 to establish a fluid seal therebetween whenever lid 14 is mounted on container brim 16. In illustrative embodiments, membrane sheet 52 has multiple layers including, for example, an inner bed layer coupled to brim 16 of container, an outer bed layer, and a core layer interposed between the inner and outer bed layers.

In illustrative embodiments, membrane sheet 52 provides a barrier lidstock and is anchored to the surrounding sheet-support ring 50 to form lid 14. It is within the scope of this disclosure to use insert-molding techniques to overmold sheet-support ring 50 onto the multi-layer membrane sheet 52 to form lid 14. In illustrative embodiments, membrane sheet 52 is bonded permanently to sheet-support ring 50.

Figure 6A:
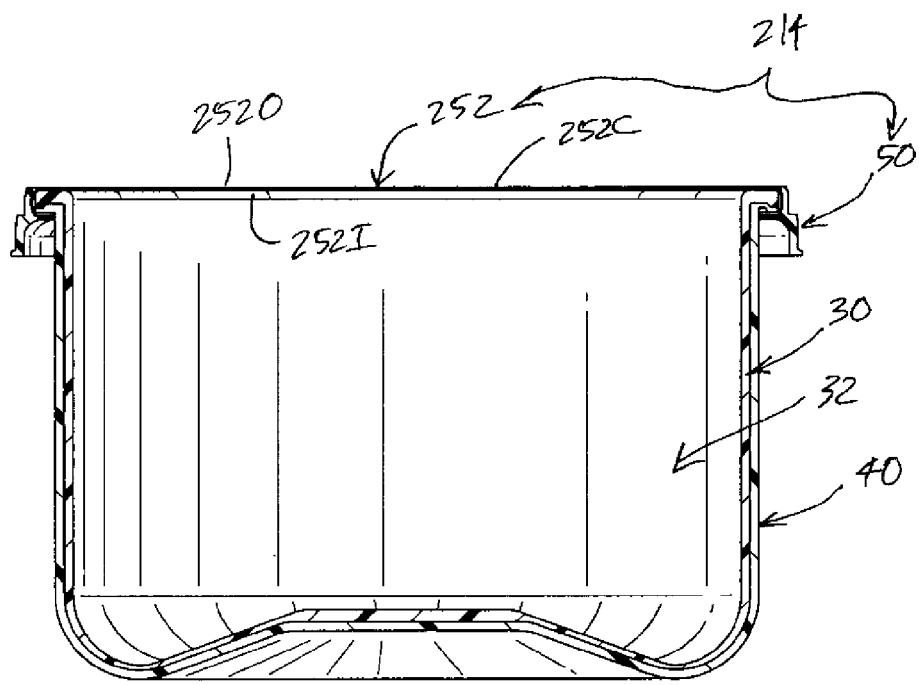
FIG. 6A is a sectional view similar to FIG. 6 showing another embodiment of a lid in which the pre-expansion shape of the sheet membrane is substantially flat.
Figure 6B:
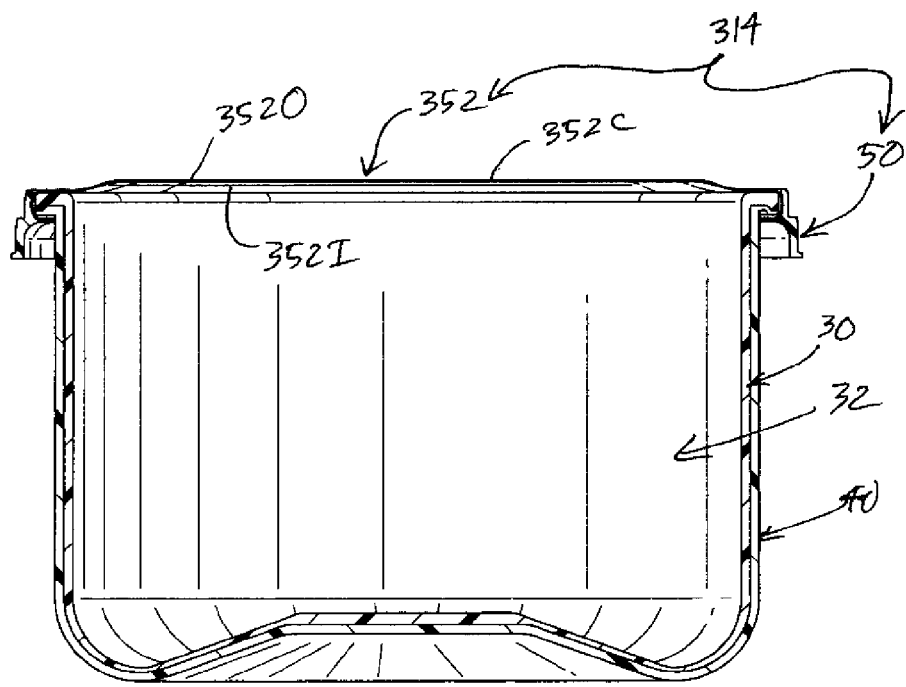
FIG. 6B is a sectional view similar to FIG. 6 showing yet another embodiment of a lid in which the pre-expansion shape of the sheet membrane is bowed outwardly.
Figure 7:
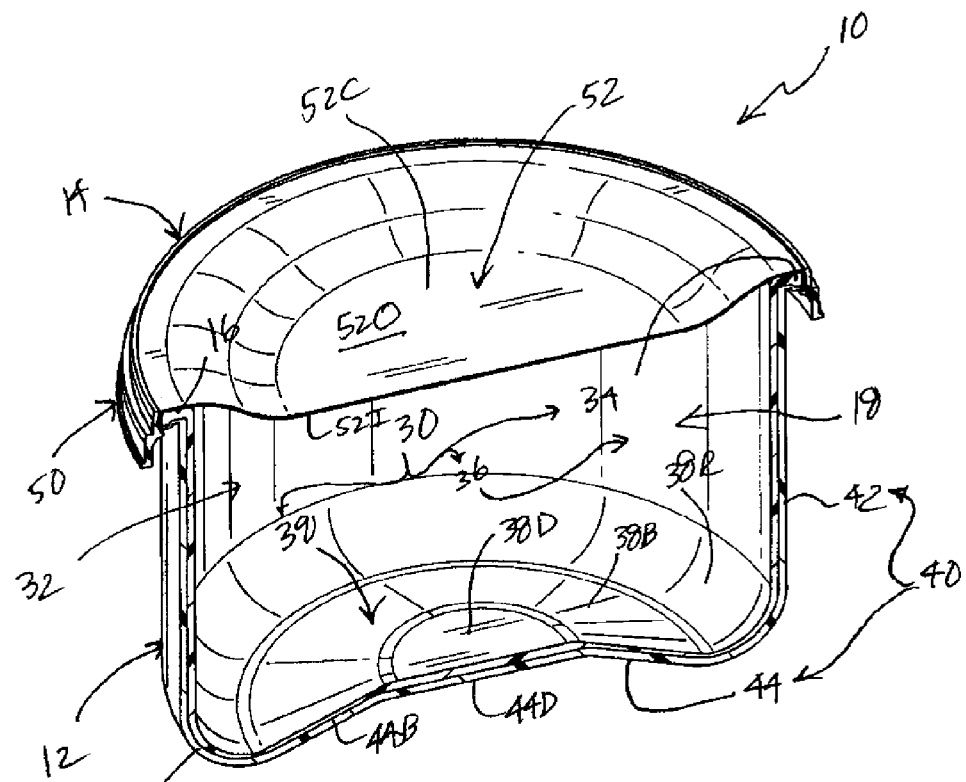
FIG. 7 is a partial perspective view taken along line 7-7 of FIG. 5 showing an illustrative uninflated shape of a cooled retortable package and showing an illustrative uninflated lid and container floor.
Figure 10:
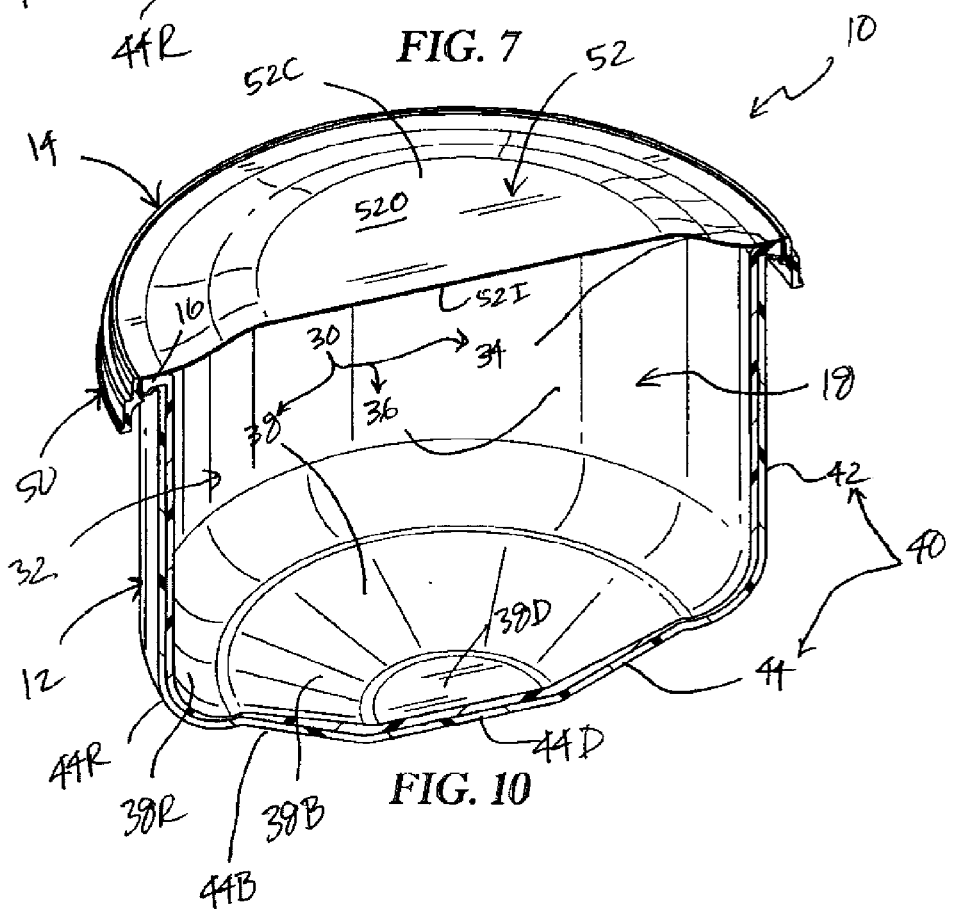
FIG. 10 is a partial perspective view taken along line 10-10 of FIG. 8 showing an illustrative inflated shape of a heated retortable package and showing an illustrative inflated lid and container floor.
Figure 8:
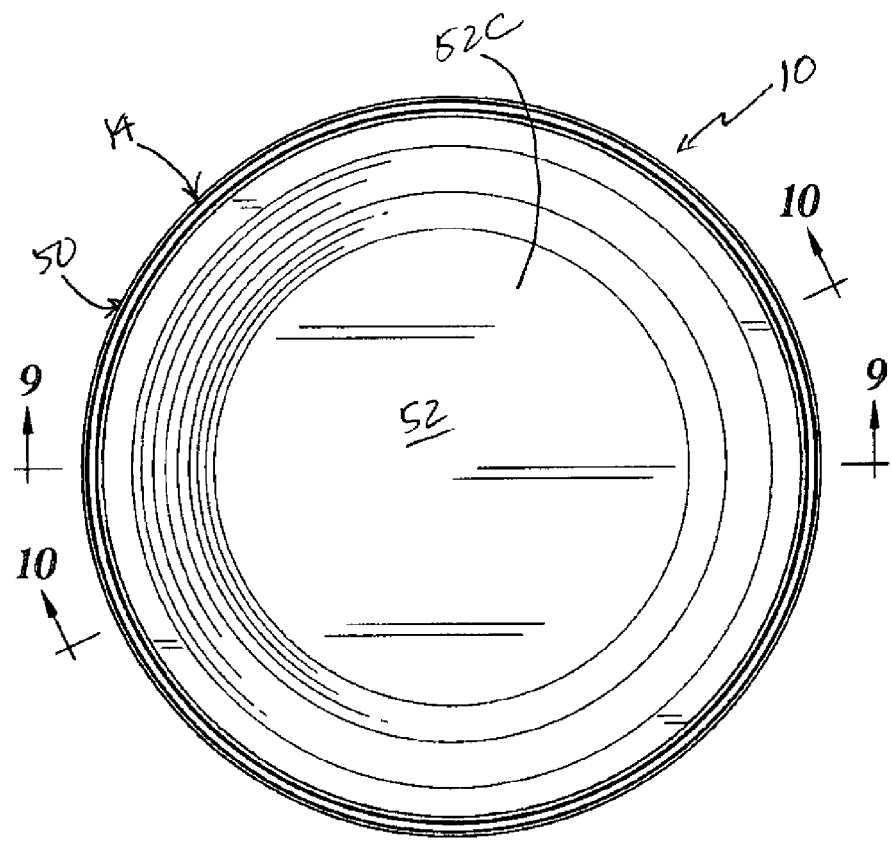
FIG. 8 is an enlarged top plan view of the package of FIG. 2.
Figure 9:
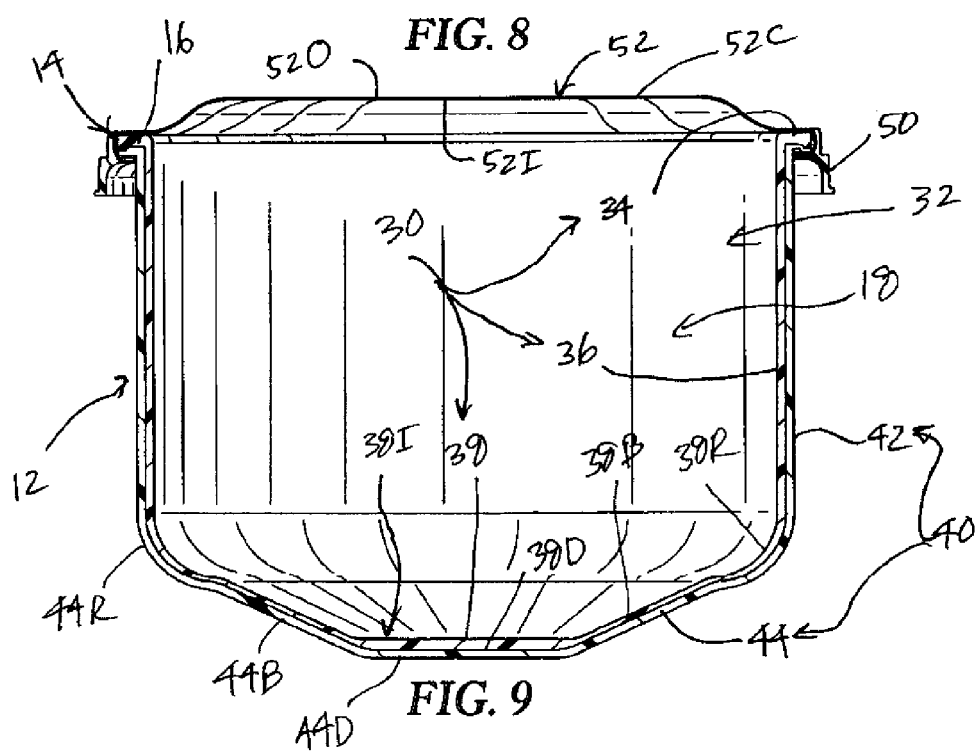
FIG. 9 is a sectional view taken along line 9-9 of FIG. 8 showing that each of the elastic expansible sheet membrane included in the lid and the elastic expansible floor included in the container move to assume an inflated shape to increase the volume of the variable-volume interior chamber of the retortable package when the retortable package is exposed to heat sufficient to raise the pressure in the variable-volume interior chamber formed in the retortable package without breaking the hermetically sealed connection between the lid and the container and without bursting or damaging the lid or the container of the retortable package.

Membrane sheet 52 of lid 14 is expansible and elastic and configured to move from the inwardly extending pre-expansion shape (surrounded in part by side wall 121) shown in FIGS. 6 and 7 to the outwardly extending inflated shape (extended away from floor 122) shown in FIGS. 9 and 10 in response to an increase in pressure in variable-volume interior chamber 18 of retortable package 10. It is within the scope of this disclosure to configure membrane sheet 52 to have a flat pre-expansion shape as shown in FIG. 6A or an upwardly bowed pre-expansion shape as shown in FIG. 6B.

Sheet-support ring 50 provides a lid-ring frame for the multi-layer membrane sheet 52. In an illustrative embodiment, sheet-support ring 50 is configured to mate temporarily in snapping relation with a portion of container brim 16 overlying an outwardly extending undercut space formed in container 12 so that container lid 14 is removable and reclosable.

In a container-filling process in accordance with the present disclosure, a product 20 (e.g., food) is deposited into interior product-storage region 32 formed in cup 30. Then lid 14 is mounted on container 12 to close an opening 33 into interior product-storage region 32 to create a variable-volume interior chamber 18 in a retortable package 10 as suggested in FIG. 6 and to cause a sealant layer established by an inner bed layer in membrane sheet 52 to mate with brim 16 of container 12 as suggested in FIG. 6. Then, for example, a sealant layer established by the inner bed layer of membrane sheet 52 is welded to container brim 16 using heat applied to the inner bed layer through an outer bed layer and a core layer of membrane sheet 52 or other suitable means. It is within the scope of the present disclosure to couple the inner bed layer of membrane sheet 52 to container brim 16 through heat applied by conduction or transmission of ultrasonic or electromagnetic energy.

In illustrative embodiments, sheet-support ring 50 has an endless (e.g., round, ring-shaped, square, oblong, etc.) edge shaped to mate with a companion container 12. Sheet-support ring 50 may be thermoformed or otherwise molded of a suitable plastics material. Suitable materials include polypropylene (PP) or high-density polyethylene (HDPE). Sheet-support ring 50 may also be made of polyethylene terephthalate (PET) or crystallized polyethylene terephthalate (CPET) to improve barrier properties. Sheet-support ring 50 may also be made using a coextruded material with barrier polymers such as EVOH or PVdC in a center layer.

In illustrative embodiments, multi-layer membrane sheet 52 can be produced using a coextruded film or sheet product comprising, for example, PP or HDPE. Membrane sheet 52 may also include one or more barrier layers such as EVHO, NYLON, or PVdC, tie layers, and a sealant layer. The sealant layer may comprise metalized LDPE or LLDPE, PP-based sealant, blends of PP and polybutane, as well as EMA- and EVA-based sealants.

Membrane sheet 52 is flexible and configured to move, deform, and conform in response to changes in pressure extant in the sealed variable-volume interior chamber 18 formed in retortable package 10. Membrane sheet 52 is peelable to facilitate disengagement from container brim 16 during removal of lid 14 from container 12 by a consumer to access contents 20 in interior product-storage region 32 of cup 30.

A retortable package 10 includes a cup 30 and a lid 14 as suggested in FIGS. 1-6. Cup 30 includes a bottom panel 38, a side panel 36 arranged to extend upwardly from bottom panel 38 and cooperate with bottom panel 38 to form an interior product-storage region 32, and a brim 34 coupled to side panel 36 as suggested in FIGS. 4-6. Brim 34 of cup 30 is arranged to border an opening into interior product-storage region 32. Lid 14 is adapted to mate with brim 34 of cup 30 to close the opening into interior product-storage region 32 to form the retortable package 10 and establish a variable-volume interior chamber 18 therein.

An expansible portion (e.g., 52C) of lid 14 is made of an elastic deformable material as suggested in FIGS. 1-3, 6, and 9. This expansible portion 52C of lid 14 is configured to provide lid means for yielding elastically during exposure of an inner surface 52I of the expansible portion 52C of lid 14 to an elevated pressure in excess of a predetermined pressure that is extant in variable-volume interior chamber 18 when lid 14 is sealed hermetically to brim 34 of cup 30 and cup 30 and lid 14 are subjected to elevated retort temperatures to sterilize any product 20 contained in variable-volume interior chamber 18 to cause shape-changing movement of the expansible portion 52C of lid 14 from a selected pre-expansion shape shown, for example, in FIGS. 1, 6, and 7 in a direction away from bottom panel 38 of cup 30 to an outwardly extending inflated shape shown, for example, in FIGS. 2, 9, and 10 to cause variable-volume interior chamber 18 to increase in volume without any discharge of fluid from variable-volume interior chamber 18 to surroundings outside of variable-volume interior chamber 18 and then contracting to assume a contracted shape that is the same or nearly the same as the selected pre-expansion shape as suggested in FIG. 3 in response to cooling of variable-volume interior chamber 18.

Figure 5:
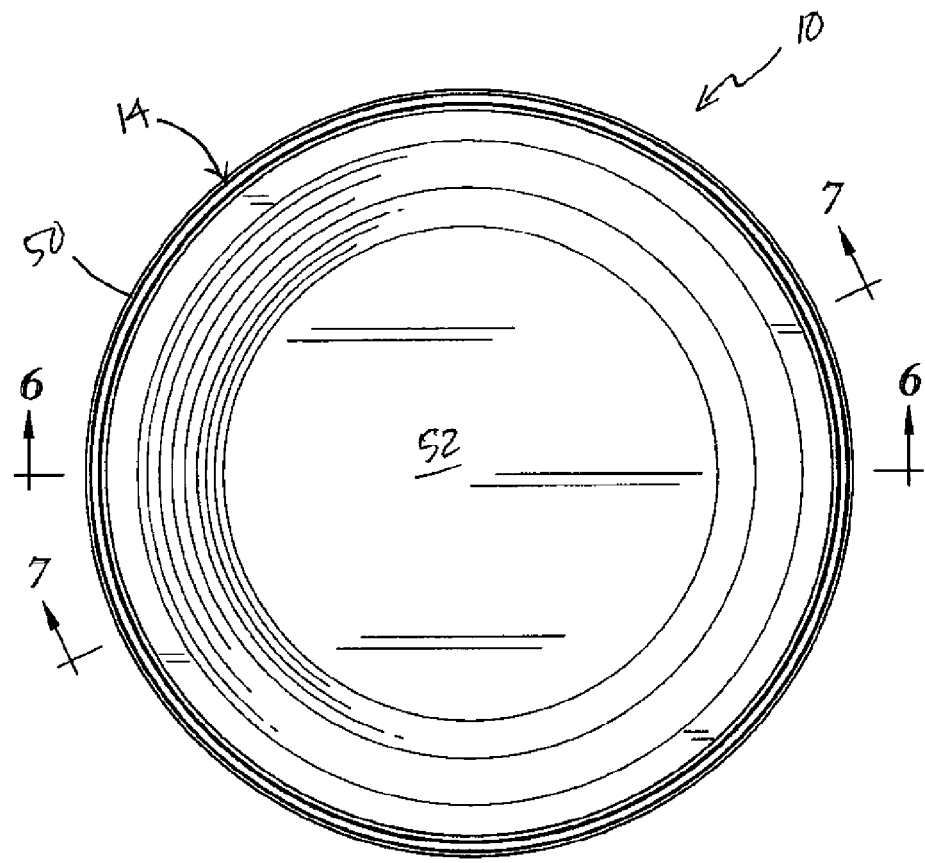
FIG. 5 is an enlarged top plan view of the package of FIG. 1 and including components shown in FIG. 4.
Figure 11:
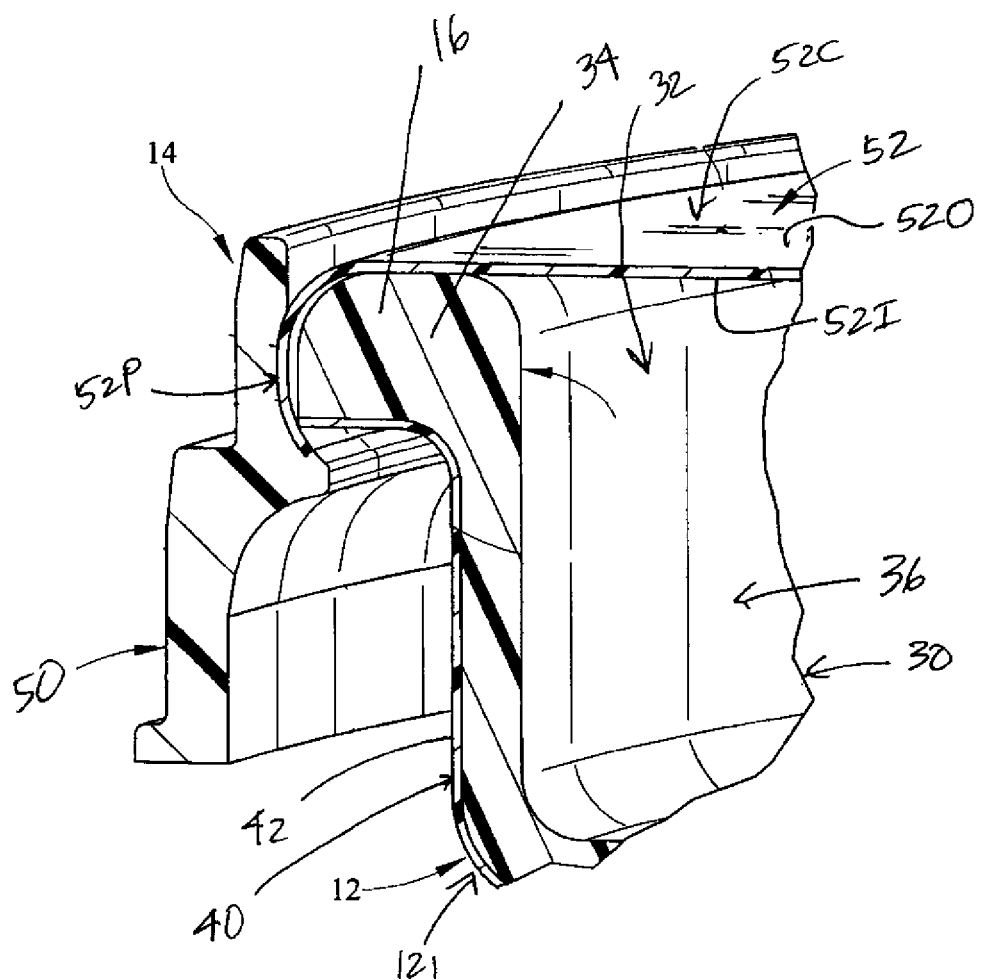
FIG. 11 is an enlarged partial perspective view after the lid has been mounted on the brim showing mating engagement of a portion of the expansible membrane sheet and the brim.

Lid 14 includes a sheet-support ring 50 and a membrane sheet 52 as suggested in FIGS. 4-6. Membrane sheet 52 has a peripheral portion 52P coupled to sheet-support ring 50 as suggested in FIG. 11 and a central portion 52C closing the opening into interior product-storage region 32 of cup 30 when sheet-support ring 50 is mated with brim 34 of cup 30 as suggested in FIGS. 6 and 7.

Membrane sheet 52 includes an outer surface 52O and an inner surface 52I as suggested in FIG. 6. A section of outer surface 52O of peripheral portion 52P is bonded permanently to sheet-support ring 50 as suggested in FIG. 11. The expansible portion of lid 14 is defined by central portion 52C in illustrative embodiments. Central portion 52C of membrane sheet 52 is bowed inwardly toward bottom panel 38 when moved to assume the selected pre-expansion shape of lid 14 as suggested in FIGS. 1, 6, and 7. Central portion 52C of membrane sheet 52 is surrounded by a portion of side panel 36 of cup 30 when central portion 52C of membrane sheet 52 assumes the selected pre-expansion shape as suggested in FIG. 6. The portion of outer surface 52O included in central portion 52C has a concave shape when central portion 52C moves to assume the selected pre-expansion shape as suggested in FIGS. 1, 6, and 7 and the portion of inner surface 52I included in central portion 52C has a convex shape when central portion 52C moves to assume the selected pre-expansion shape as suggested in FIGS. 2, 9, and 10.

In the alternative embodiment shown in FIG. 6A, an alternative lid 214 is provided in which the portion of outer surface 252O included in central portion 252C has a substantially flat shape when central portion 252C moves to assume the selected pre-expansion shape. The portion of inner surface 252I included in central portion 252C has a substantially flat shape when central portion 252C moves to assume the selected pre-expansion shape.

In the alternative embodiment shown in FIG. 6B, an alternative lid 314 is provided in which the portion of outer surface 352O included in central portion 352C has a convex shape when central portion 352C moves to assume the selected pre-expansion shape. The portion of inner surface 352I included in central portion 352C has a concave shape when central portion 352C moves to assume the selected pre-expansion shape.

The expansible portion 52C of lid 14 is arranged to extend into interior product-storage region 32 of cup 30 upon movement of expansible portion 52 of lid 14 to assume the selected pre-expansion shape as suggested in FIGS. 1, 6, and 7. The expansible portion 52C of lid 14 is arranged to lie outside of interior product-storage region 32 of cup 30 upon movement of the expansible portion 52C of lid 14 to assume the outwardly extending inflated shape as suggested in FIGS. 2, 9, and 10. The contracted shape is substantially the same as the selected pre-expansion shape in illustrative embodiments as suggested in FIGS. 1 and 3.

Bottom panel 38 of the cup is made of an elastic deformable material as suggested in FIGS. 6 and 9. Bottom panel 38 is configured to provide floor means for yielding elastically during exposure of an inner surface 38I of bottom panel 38 of cup 30 to an elevated pressure in excess of a predetermined pressure that is extant in variable-volume interior chamber 18 when lid 14 is hermetically sealed to brim 34 of cup 30 and cup 30 and lid 14 are subjected to elevated retort temperatures to sterilize any product contained in variable-volume interior chamber 18 to cause shape-changing movement of bottom panel 38 of cup 30 from a selected pre-expansion shape suggested, for example, in FIGS. 1 and 6 in a direction away from lid 14 to an outwardly extending inflated shape shown, for example, in FIGS. 2 and 9 to cause variable-volume interior chamber 18 to increase in volume without any discharge of fluid from variable-volume interior chamber 18 to surroundings outside variable-volume interior chamber 18 and then contracting to assume a contracted shape as suggested in FIG. 3 in response to cooling of variable-volume interior chamber 18. Bottom panel 38 of cup 30 is bowed inwardly toward lid 14 when moved to assume the selected pre-expansion shape of bottom panel 38 as shown, for example, in FIG. 6.

Bottom panel 38 of cup 30 includes a round center disk 38D, a ring-shaped rim 38R coupled to side wall 36 of cup 30, and a frustoconical bridge 38B arranged to interconnect an inner edge of rim 38R and an outer edge of round center disk 38D as suggested in FIGS. 4 and 6. Round center disk 38D is arranged to lie at a first distance from lid 14 when bottom panel 38 is moved to assume the selected pre-expansion shape and at a relatively greater second distance from lid 14 when bottom panel 38 is moved to assume the outwardly extending inflated shape as suggested in FIGS. 6 and 9

The round center disk 38D of bottom panel 38 is arranged to lie below and in spaced-apart location to rim 38R upon movement of bottom panel 38 to the outwardly extending inflated shape of bottom panel 38 to locate frustoconical bridge 38B therebetween as suggested in FIGS. 9 and 10. The rim 38R is arranged to surround each of frustoconical bridge 38B and round center disk 38D upon movement of bottom panel 38 to assume the selected pre-expansion shape of bottom panel 38 as suggested in FIGS. 6 and 7.

Retortable package 10 further comprises an exterior casing 40 including a sleeve 42 made of film wrapped around an exterior surface of side panel 36 of cup 30 and a base 44 made of film and coupled to a lower end of sleeve 42 as suggested in FIGS. 4 and 6. Base 44 is arranged to mate with an underside of bottom panel 38 of cup 30 and move with bottom panel 38 during shape-changing movement of bottom panel 38 relative to side panel 36 as suggested in FIGS. 6 and 9.

Base 44 is made of a pliable material and includes a round center disk 44D coupled to round center disk 38D of bottom panel 38 as suggested in FIGS. 4 and 6. Base 44 also includes a ring-shaped rim 44R coupled to ring-shaped rim 38R of bottom panel 38 and a frustoconical bridge 44B coupled to frustoconical bridge 38B of bottom panel 38. Frustoconical bridge 44B is arranged to interconnect an inner edge of rim 44R of base 44 and an outer edge of round center disk 44D of base 44.

Exterior casing 40 is configured in an illustrative embodiment to provide means for providing a support web on exterior surfaces of side and bottom panels 36, 38 of cup 30 to rigidify cup 30 to allow each of side and bottom panels 36, 38 of cup 30 to be made of thin non-rigid materials yet allow shape-changing movement of bottom panel 38 among the selected pre-expansion, outwardly extending inflated, and contracted shapes. Exterior casing 40 is configured in an illustrative embodiment to provide means for providing an oxygen-barrier shield to block flow of oxygen from the surroundings into interior product-storage region 32 through side and bottom panels 36, 38 of cup 30.

An illustrative process for forming container 12 is shown in FIGS. 12-16. As an example, the process for forming container 12 is a molding process. A molding machine 60 includes a female mold 61, a companion male mold 62, and a core dispenser 64 as shown in FIGS. 13-16.

Figure 12:
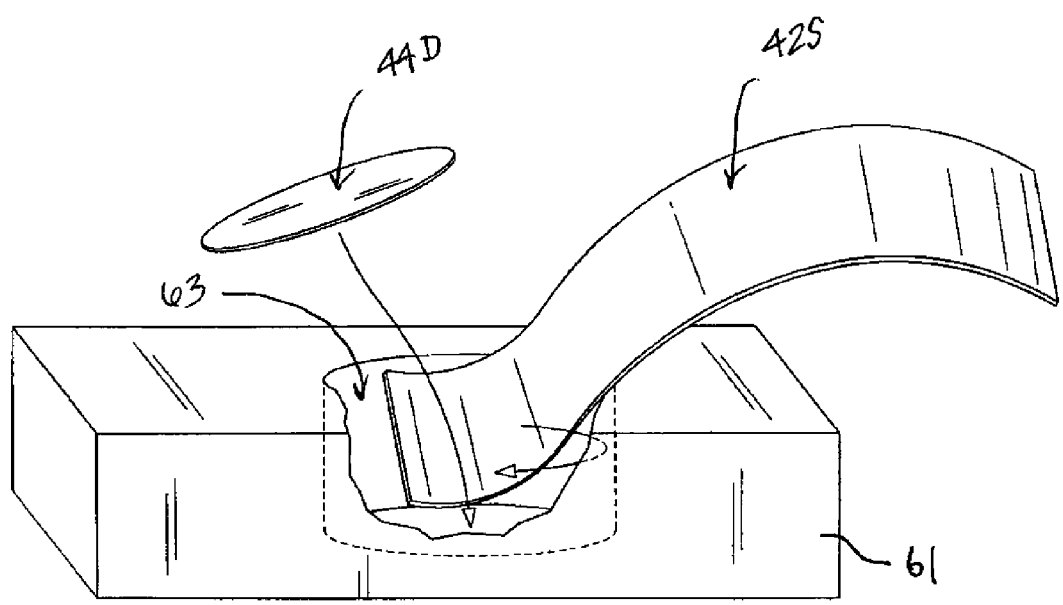

In an initial stage of molding, strip 42S and disk 44D are placed in female mold 61 as shown in FIG. 12. Male mold 62 moves toward and engages female mold 61 to form mold cavity 63 therebetween and strip 42S and disk 44D lie therein as shown in FIG. 15.

Figure 17:
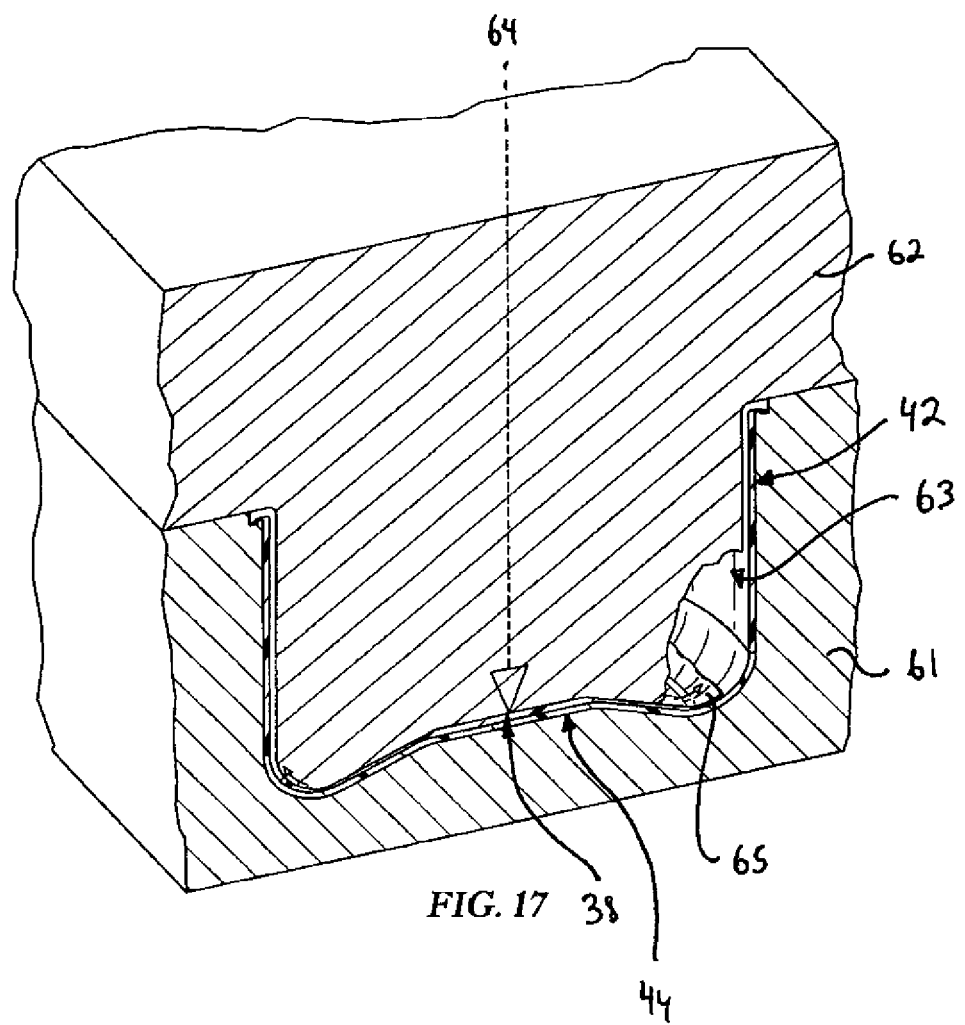
FIG. 17 is a view similar to FIG. 15 showing the molten plastics material flowing inside the mold cavity between the upper mold portion, the film strip, and the film disk causing the film strip to be coupled to the film disk so that the exterior casing is established.

In a subsequent stage of molding, core dispenser 64 injects molten plastics material 65 through male mold 62 and into mold cavity 63 as shown in FIGS. 15 and 17. As molten plastics material 65 fills mold cavity 63, strip 42S and disk 44D are coupled together to form exterior casing 40 which surrounds and is coupled to cup 30 which is produced when molten plastics materials 65 solidifies.

In a final stage of molding, molten plastics materials 65 solidifies to form cup 30. Male mold 62 moves away from female mold 61 and completed container 12 is separated from female mold 61 as shown in FIG. 16.

Figure 18:
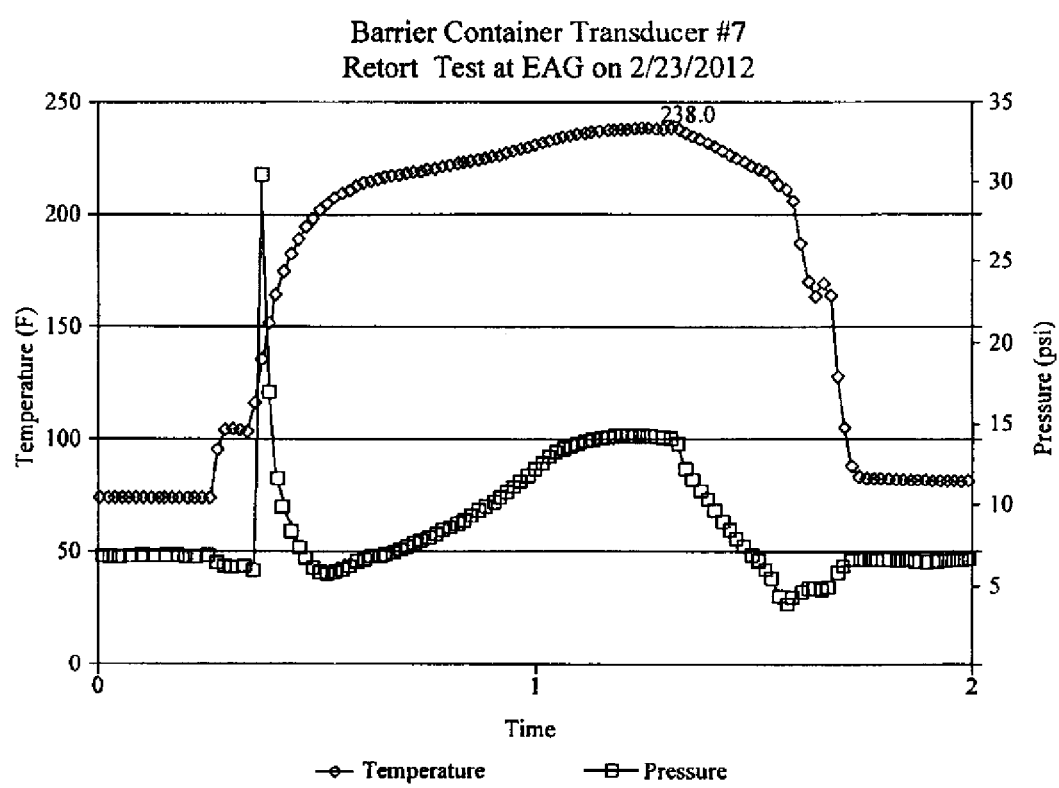
FIG. 18 is a graph showing how temperature and pressure in the variable-volume interior chamber formed in the retortable package change over time during exposure of the package to high temperatures in the oven.

As shown in FIG. 18, pressure and temperature in variable-volume interior chamber 18 of retortable package 10 change over time during exposure to high temperatures in oven 28 during sterilization of retortable package 10 and its contents. As an example, pressure in interior chamber 18 remains generally constant until heat is applied and temperature in interior chamber 18 increases. As a result, pressure in interior chamber 18 increases rapidly until the volume of interior chamber 18 changes because expansible elastic portions (e.g., portions of membrane sheet 52 in lid 14 and floor 122 in container 12) expand as suggested in FIGS. 2 and 8-10 to assume inflated shapes. As the volume of variable-volume interior chamber 18 increases rapidly, pressure decreases rapidly while temperature continues to increase. Temperature increases until an elevated predetermined temperature in interior chamber 18 is achieved. Pressure also increases while sterilization completes without bursting or damaging retortable package 10. Once package 10 is cooled, pressure and temperature decrease causing retortable package 10 to contract and return to the pre-expansion shape or nearly to the pre-expansion shape.

A retortable package 210 in accordance with the present disclosure is shown in FIGS. 19 and 20. Illustrative components used to create retortable package 210 includes a container 212 and a lid 14. Container 212 includes a cup 230 and an exterior casing 240. Exterior casing 40 is coupled to exterior surfaces of cup 230 to produce container 212.

Cup 230 is formed to include an interior product-storage region 232 and an annular brim bordering an opening into interior product-storage region 232. Cup 230 also includes an annular side panel 236 coupled to the annular brim and a bottom panel 238 coupled to a lower portion of side panel 236 to cooperate therewith to form interior product-storage region 232. Bottom panel 238 of cup 230 is made of an expansible elastic material. Cup 230 is monolithic in an illustrative embodiment. Lid 14 is adapted to mate with a brim of container 212 to close the opening into interior product-storage region 232 formed in cup 230.

Bottom panel 238 includes a center plate 238C and series of bands 238B that are connected to one another at center plate 238C as suggested in FIG. 19. Each band 238B is arranged to extend radially away from center 238C and couple to annular side panel 236 as shown in FIG. 19. As an example, an included angle 23 of about 22.5 degrees is formed between each pair of neighboring bands. Between each pair of neighboring bands 238B and annular side panel 236, an aperture 254 is formed in bottom panel 238 so that plastics material included in cup 230 is minimized. As an illustrative example, base 44 of exterior casing 240 mates with bottom panel 238 to close apertures 254 as shown in FIGS. 19 and 20.

The invention claimed is:

1. A retortable package comprising
a cup including a bottom panel, a side panel arranged to extend upwardly from the bottom panel and cooperate with the bottom panel to form an interior product-storage region, and a brim coupled to the side panel and arranged to border an opening into the interior product-storage region and
a lid adapted to mate with the brim of the cup to close the opening into the interior product-storage region to form the retortable package and establish a variable-volume interior chamber therein, wherein an expansible portion of the lid is made of an elastic deformable material and is configured to provide lid means for yielding elastically during exposure of an inner surface of the expansible portion of the lid to an elevated pressure in excess of a predetermined pressure that is extant in the variable-volume interior chamber when the lid is sealed hermetically to the brim of the cup and the cup and lid are subjected to elevated retort temperatures to sterilize any product contained in the variable-volume interior chamber to cause shape-changing movement of the expansible portion of the lid from a selected pre-expansion shape in a direction away from the bottom panel of the cup to an outwardly extending inflated shape to cause the variable-volume interior chamber to increase in volume without any discharge of fluid from the variable-volume interior chamber to surroundings outside of the variable-volume interior chamber and then contracting to assume a contracted shape in response to cooling of the variable-volume interior chamber
wherein the bottom panel of the cup is made of an elastic deformable material and is configured to provide floor means for yielding elastically during exposure of an inner surface of the bottom panel of the cup to an elevated pressure in excess of a predetermined pressure that is extant in the variable-volume interior chamber when the lid is hermetically sealed to the brim of the cup and the cup and lid are subjected to elevated retort temperatures to sterilize any product contained in the variable-volume interior chamber to cause shape-changing movement of the bottom panel of the cup from a selected pre-expansion shape in a direction away from the lid to an outwardly extending inflated shape to cause the variable-volume interior chamber to increase in volume without any discharge of fluid from the variable-volume interior chamber to surroundings outside the variable-volume interior chamber and then contracting to assume a contracted shape in response to cooling of the variable-volume interior chamber, and
further comprising an exterior casing including a sleeve made of film wrapped around a surface of the side panel of the cup and a base made of film and coupled to a lower end of the sleeve and arranged to mate with an underside of the bottom panel of the cup and move with the bottom panel during shape-changing movement of the bottom panel relative to the side panel.

2. The retortable package of claim 1, wherein the bottom panel of the cup is bowed inwardly toward the lid when moved to assume the selected pre-expansion shape of the bottom panel.

3. The retortable package of claim 2, wherein the bottom panel of the cup includes a round center disk, a ring-shaped rim coupled to the side wall of the cup, and a frustoconical bridge arranged to interconnect an inner edge of the rim and an outer edge of the round center disk.

4. The retortable package of claim 3, wherein the round center disk is arranged to lie at a first distance from the lid when the bottom panel is moved to assume the selected pre-expansion shape and at a relatively greater second distance from the lid when the bottom panel is moved to assume the outwardly extending inflated shape.

5. The retortable package of claim 4, wherein the round center disk is arranged to lie below and in spaced-apart location to the rim upon movement of the bottom panel to the outwardly extending inflated shape of the bottom panel to locate the frustoconical bridge therebetween.

6. The retortable package of claim 4, wherein the rim is arranged to surround each of the frustoconical bridge and the round center disk upon movement of the bottom panel to assume the selected pre-expansion shape of the bottom panel.

7. The retortable package of claim 1, wherein the base is made of a pliable material and includes a round center disk coupled to the round center disk of the bottom panel, a ring-shaped rim coupled to the ring-shaped rim of the bottom panel, and a frustoconical bridge coupled to the frustoconical bridge of the bottom panel and arranged to interconnect an inner edge of the rim of the base and an outer edge of the round center disk of the base.

8. The retortable package of claim 1, wherein the exterior casing is configured to provide means for providing a support web on exterior surfaces of the side and bottom panels to rigidify the cup to allow each of side and bottom panels of the cup to be made of thin non-rigid materials yet allow shape-changing movement of the bottom panel among the selected pre-expansion, outwardly extending inflated, and contracted shapes.

9. The retortable package of claim 1, wherein the exterior casing is configured to provide means for providing an oxygen-barrier shield to block flow of oxygen from the surroundings into the interior product-storage region through the side and bottom panels of the cup.

10. A retortable package comprising
a cup including a bottom panel, a side panel arranged to extend upwardly from the bottom panel and cooperate with the bottom panel to form an interior product-storage region, and a brim coupled to the side panel and arranged to border an opening into the interior product-storage region and a lid adapted to mate with the brim of the cup to close the opening into the interior product-storage region to form the retortable package and establish a variable-volume interior chamber therein, wherein an expansible portion of the lid is made of an elastic deformable material and is configured to provide lid means for yielding elastically during exposure of an inner surface of the expansible portion of the lid to an elevated pressure in excess of a predetermined pressure that is extant in the variable-volume interior chamber when the lid is sealed hermetically to the brim of the cup and the cup and lid are subjected to elevated retort temperatures to sterilize any product contained in the variable-volume interior chamber to cause shape-changing movement of the expansible portion of the lid from a selected pre-expansion shape in a direction away from the bottom panel of the cup to an outwardly extending inflated shape to cause the variable-volume interior chamber to increase in volume without any discharge of fluid from the variable-volume interior chamber to surroundings outside of the variable-volume interior chamber and then contracting to assume a contracted shape in response to cooling of the variable-volume interior chamber wherein the bottom panel of the cup is made of an elastic deformable material and is configured to provide floor means for yielding elastically during exposure of an inner surface of the bottom panel of the cup to an elevated pressure in excess of a predetermined pressure that is extant in the variable-volume interior chamber when the lid is hermetically sealed to the brim of the cup and the cup and lid are subjected to elevated retort temperatures to sterilize any product contained in the variable-volume interior chamber to cause shape-changing movement of the bottom panel of the cup from a selected pre-expansion shape in a direction away from the lid to an outwardly extending inflated shape to cause the variable-volume interior chamber to increase in volume without any discharge of fluid from the variable-volume interior chamber to surroundings outside the variable-volume interior chamber and then contracting to assume a contracted shape in response to cooling of the variable-volume interior chamber, and wherein the bottom panel of the cup includes a center plate and a series of bands coupled to center plate and arranged to extend in radially outward directions to mate with a lower edge of the side panel of the cup.

11. The retortable package of claim 10, wherein an acute included angle and an aperture is formed between each pair of neighboring bands.

12. The retortable package of claim 10, further comprising an exterior casing including a sleeve made of film wrapped around an exterior surface of the side panel of the cup and a base made of film and coupled to a lower end of the sleeve and arranged to mate with an underside of the bottom panel of the cup and move with the bottom panel during shape-changing movement of the bottom panel relative to the side panel and the base of the exterior casing mates with the bottom panel of the cup to close an aperture formed between each pair of neighboring bands.

* * * * *